March 10, 1953 L. I. HALL ET AL 2,630,715
LIQUID LEVEL GAUGE
Filed Sept. 26, 1950
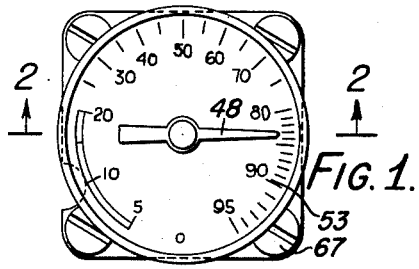
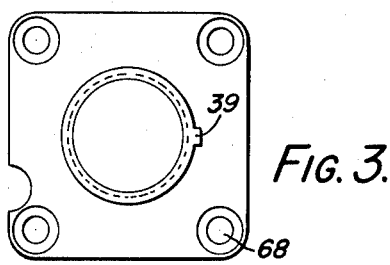
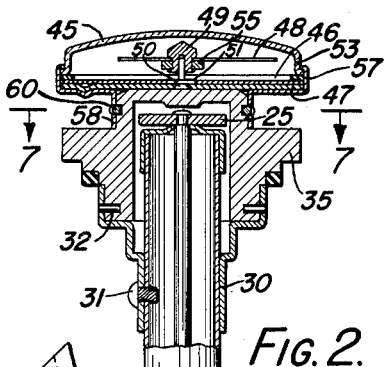
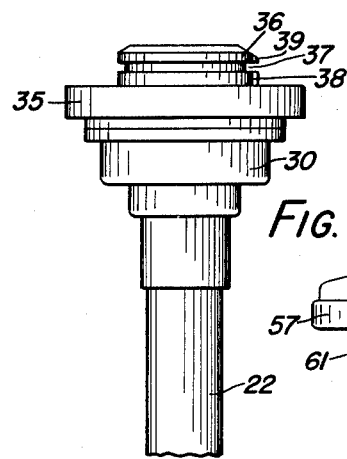
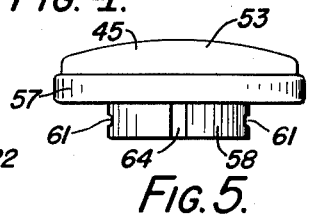
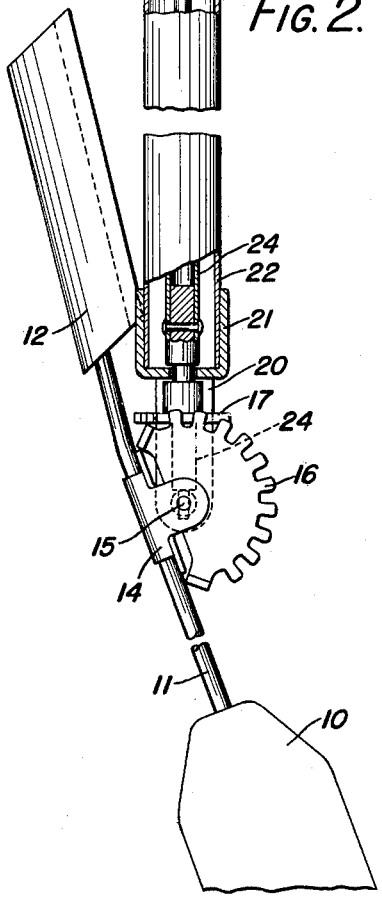
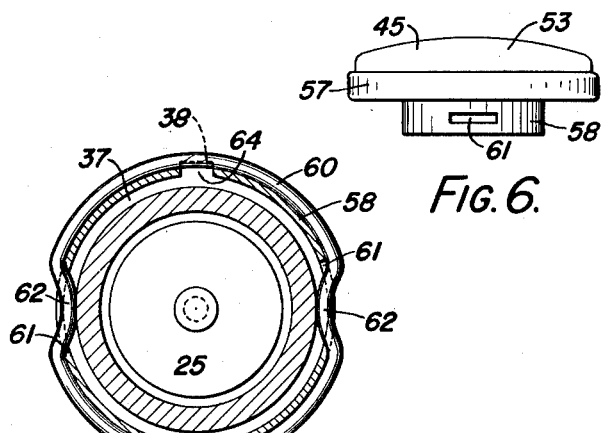
*INVENTOR.*
*LEONARD I. HALL*
*AND REIDAR A. TOLLEFSEN*
BY
*ATTORNEY*

Patented Mar. 10, 1953

2,630,715

UNITED STATES PATENT OFFICE 2,630,715

LIQUID LEVEL GAUGE

Leonard I. Hall, Rochester, and Reidar A. Tollefsen, Brighton, N. Y., assignors to Rochester Manufacturing Company, Inc., Rochester, N. Y., a corporation of New York Application September 26, 1950, Serial No. 186,838

2 Claims. (Cl. 73—317)

The present invention relates to gauges and more particularly to liquid-level gauges such as are employed on storage tanks for butane, propane and other liquified petroleum gases. In a still more specific aspect, the invention relates to a liquid-level gauge of the type in which the indicator is magnetically actuated.

In conventional liquid-level gauges the indicator of the gauge is fixedly secured to the body portion of the gauge. The size of the indicator dial is, therefore, limited by reason of the fact that the dial size must be kept to a diameter to permit access to the screws used for fastening the gauge to the tank or other liquid container.

One object of the present invention is to provide a liquid-level gauge which will permit use on a gauge of a given size of an indicator dial of much larger diameter than it has heretofore been possible to use.

Another object of the invention is to provide a liquid-level gauge in which the diameter of the indicating dial is wholly independent of the size of the gauge itself, and in which the indicating dial can be made of any desired diameter.

Another object of the invention is to provide a liquid-level gauge having a readily removable and replaceable indicator dial chamber.

A further object of the invention is to provide a liquid-level gauge having a removable dial chamber which is completely sealed.

Other objects of the invention will be apparent hereinafter from the specification and from the recital of the appended claims.

In the drawing:

Fig. 1 is a plan view of a gauge constructed according to one embodiment of this invention;

Fig. 2 is a vertical section through the gauge taken on the line 2—2 of Fig. 1 and looking in the direction of the arrows;

Fig. 3 is a plan view of the body portion of the gauge with the dial chamber removed therefrom;

Fig. 4 is a fragmentary elevation of the body portion of the gauge with the dial chamber removed;

Fig. 5 is an elevation of the removable dial chamber;

Fig. 6 is an elevation of the removable dial chamber taken at right angles to the view of Fig. 5; and Fig. 7 is an enlarged sectional view on the line 7—7 of Fig. 2.

The actuating mechanism of the gauge is conventional in construction. It comprises a float 10 which is secured to one end of an arm 11 to the opposite end of which is connected a counterweight 12. The arm 11 is pivoted by means of a clip or plate 14 on a stud 15. The plate is attached to a gear segment 16 that meshes with a spur gear 17. The stud 15 is secured against rotation in the furcations of a yoke 20. The yoke has two diametrically opposed upturned tongues 21 which are welded or otherwise secured to a supporting post or column 22. The gear 17 is fastened to a shaft 24. This shaft is journaled at its lower end in the stud or bar 15. It extends upwardly through a hole in the yoke 20, and is somewhat enlarged in diameter above the yoke. It is mounted coaxially within the column or tube 22, and has secured to its upper end a magnet 25.

A cup member 30 is secured by screws 31 to the upper end of the column 22 and secured within this cup member 30 by pins 32 is the head 35 of the gauge body. This head 35 has an upwardly projecting nose portion 36. The nose portion 36 is formed with a peripheral groove 37 and with axially-aligned locating keys 38 and 39.

The dial chamber is denoted generally at 45. It comprises an indicator dial 46, and a needle or pointer 48. The indicator dial seats against a backing member 47. The needle 48 is secured to a hub member 49 that is journaled on a pin 50 which is riveted in the backing member 47 and which is formed intermediate its ends with an enlarged disc-like portion 51 that fits into a hole of and centers the dial 46. The dial 46 is suitably graduated on its face so that the pointer 48 can indicate the level of liquid in the tank with which the gauge is used. The indicator needle 48 itself may be permanently magnetized, or there may be secured on the hub 49 beneath the pointer 48 a disc magnet 55 which cooperates with the disc magnet 25, when the dial chamber is mounted on the body of the gauge, to transmit the motion of the float arm 11 to the needle 48.

The dial chamber is enclosed by a window 53 which is held in position by a bezel 57. The bezel 57 is formed with a skirt portion 58 that is adapted to be pushed over and to surround the nose 36 of the body member 35. The skirt 58 of the bezel is provided with an axially-extending slot 64 which is adapted to receive the key portions 38 and 39 of the head 36, to locate the dial chamber angularly on the gauge head 36 and to hold it against rotation relative to the body portion of the gauge.

Mounted around the skirt 58 of the dial chamber is a snap spring 60. The skirt has two diametrically opposed slots 61 in it and the snap spring 60 is bent as denoted at 62 (Fig. 7), to project through these two slots 61. These diametrically opposed bent portions 62 of the snap spring are adapted to snap into the peripheral groove 37 of the nose 36 of the body member 35, thus removably locking the dial chamber 45 on the body member 35.

The dial chamber can readily be removed from the body member 35 by pulling or jerking it forward. Thus the dial chamber is accessible for easy removal or placement even in the cramped quarters usually experienced in gauge mountings of liquified petroleum gas tanks.

The gauge can be secured in a tank by screws or bolts 67 that pass through holes 68 in the head 35. With the structure of the present invention the screws or bolts are readily accessible by simply removing the dial chamber, and they can be located wherever convenient.

The gauge operates when assembled in conventional manner. As the float arm moves up or down with change of level of liquid in the tank, the segment 16 rotates the gear 17 and shaft 24 in one direction or the other, rotating the magnet 25 correspondingly. Movement of the magnet 25 causes rotation of the needle 48 to read against the graduations of the dial 46.

The keys 38 and 39 of head 36 and the keyway 64 in bezel skirt 58 permit of locating the dial chamber accurately angularly with reference to the shaft 24 so that the gauge will read correctly.

With the construction shown it will be obvious that the dial can be made of any size regardless of the head size of the gauge. Heretofore, the head size of the gauge has limited the size of the dial. As a result, with the present invention dials can be made large enough, even for the smallest sizes of gauges, to be readily read.

While the invention has been described in connection with a liquid-level gauge, it is obvious that it may be applied to other forms of gauges where desired to provide a graduated dial of larger diameter than would be possible to employ were the dial chamber fixedly secured to the body of the gauge. It will further be understood that while the invention has been described in connection with a particular embodiment thereof, and a particular size therefor, it is capable of various modifications and uses, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described our invention, what we claim is:

1. A gauge comprising a body which has a neck portion at its upper end that is closed at its top, a condition-responsive member movably mounted in said body, a magnet connected to said condition-responsive member to move on movement of said member, an enclosed dial chamber comprising an indicator dial, an indicator needle, one of which is movable in the dial chamber by magnetic attraction on movement of said magnet, a sight-glass closing said chamber, and a bezel holding the sight-glass in position, said bezel having a rearwardly extending skirt to fit removably over the neck portion of said body, the neck portion of said body having a peripheral groove therein, the skirt of the bezel having a pair of diametrically opposed slots registering with said peripheral groove, and a resilient ring-like member surrounding said skirt and having diametrically opposed portions bent to extend through the slots in said skirt into said peripheral groove to hold the dial chamber removably on the body, the ends of said ring-like member being spaced from one another when it is in position, and said skirt and neck having an interengaging tongue and groove to locate the dial chamber angularly on the body and hold one against rotation relative to the other.

2. A gauge comprising a body which is closed at its top and which is formed at its upper end with a cylindrical portion that has a coaxial groove therein, a condition-responsive member movably mounted in said body, a magnet positioned directly under the top of said body and connected to said condition-responsive member to move on movement of said member, and an enclosed dial chamber having a generally-cylindrical skirt projecting rearwardly therefrom that is adapted to interfit removably with the cylindrical portion of said body and that has a pair of diametrically opposed slots therein adapted to register with the groove in said cylindrical portion of said body, an indicator dial and an indicator needle housed in said dial chamber, one of which is movable therein by magnetic attraction on movement of said magnet, an interfitting key and keyway for locating said skirt angularly on said cylindrical portion of the body, and a resilient spring member carried by said skirt and having diametrically opposed portions bent to extend through the slots in said skirt into said groove to hold the dial chamber removably on the body.

LEONARD I. HALL.
REIDAR A. TOLLEFSEN.

REFERENCES CITED

The following references are of record in the file of this patent:

UNITED STATES PATENTS

| Number | Name | Date |
|---|---|---|
| 1,529,145 | Seymour | Mar. 10, 1925 |
| 2,311,387 | Hastings | Feb. 16, 1943 |
| 2,473,581 | Ford | June 21, 1949 |